No. 12,681. REISSUED AUG. 20, 1907.
A. T. SPENCE, S. B. ZIMMER & J. H. PRUGH.
FLOOR SURFACER, CLEANER, AND POLISHER.
APPLICATION FILED APR. 8, 1905.
2 SHEETS—SHEET 1.
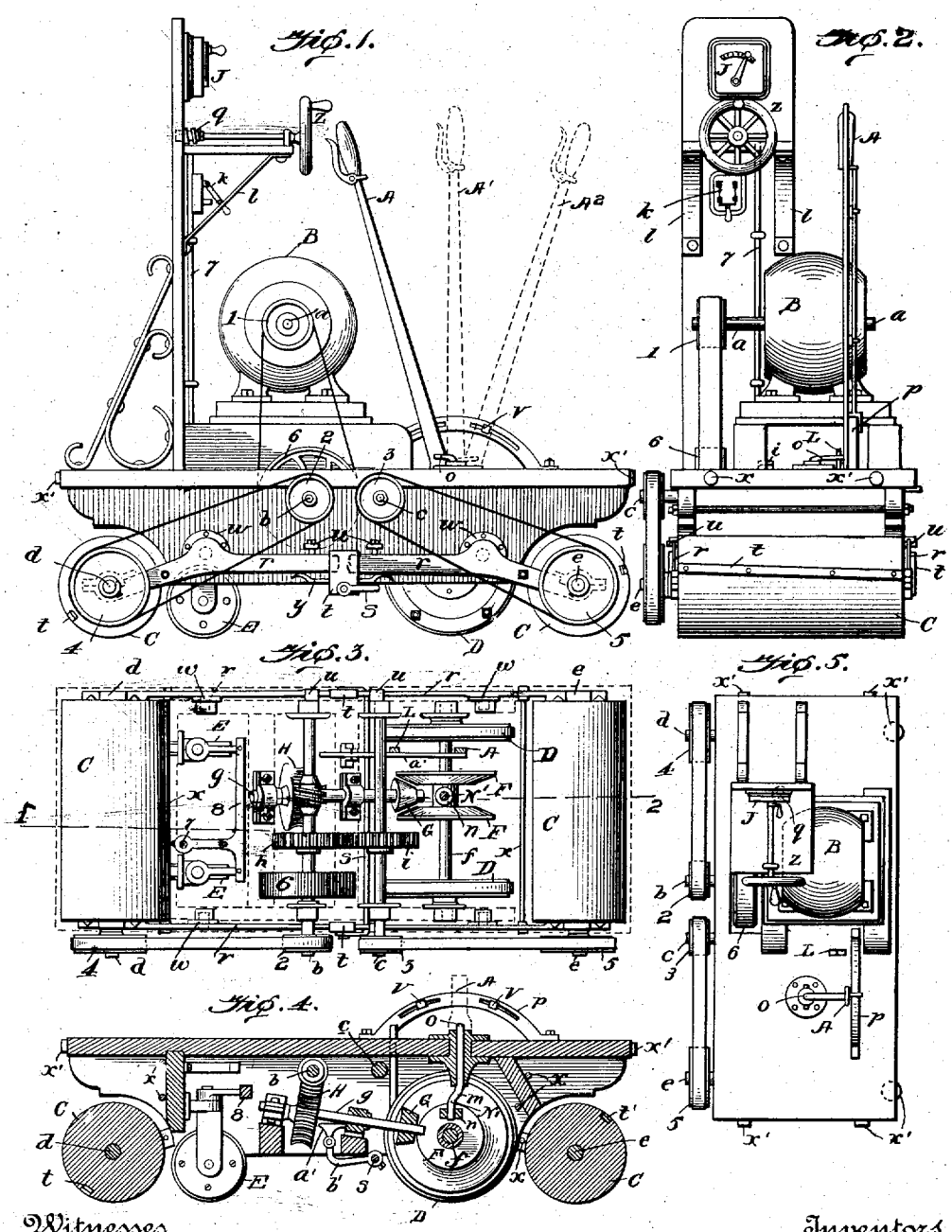
Witnesses
B. M. Offutt
C. W. Fowler
Inventors
Aaron T. Spence,
John H. Prugh,
Samuel B. Zimmer,
by George H. Strong their Attorneys No. 12,681. REISSUED AUG. 20, 1907.

A. T. SPENCE, S. B. ZIMMER & J. H. PRUGH.

FLOOR SURFACER, CLEANER, AND POLISHER.

APPLICATION FILED APR. 8, 1905.

2 SHEETS—SHEET 2.

Witnesses

B. M. Offutt.

C. W. Ziegler

Inventors

Aaron T. Spence,

John H. Prugh,

Samuel B. Zimmer,

By George H. Strong his Attorney.

UNITED STATES PATENT OFFICE.

AARON T. SPENCE, OF ALAMEDA, AND SAMUEL B. ZIMMER AND JOHN H. PRUGH, OF OAKLAND, CALIFORNIA, ASSIGNORS TO AMERICAN FLOOR SURFACING MACHINE CO., A CORPORATION OF ARIZONA TERRITORY

FLOOR SURFACER, CLEANER, AND POLISHER.

No. 12,681. Specification of Reissued Letters Patent. Reissued Aug. 20, 1907.

Original No. 728,423, dated May 19, 1903, Serial No. 95,336. Application for reissue filed April 8, 1905. Serial No. 254,613.

*To all whom it may concern:*

Be it known that we, AARON T. SPENCE, of Alameda, and SAMUEL B. ZIMMER and JOHN H. PRUGH, of Oakland, all in the county of Alameda and State of California, citizens of the United States, have invented new and useful Improvements in Floor Surfacers, Cleaners, and Polishers, of which the following is a specification.

The object of our invention is to provide an improved machine for surfacing or cleaning floors of wood of every kind, as well as grinding or polishing those of mosaic, marble, or any composition.

Our invention consists of certain features of construction and combination of parts, which are hereinafter described and particularly claimed.

Figure 6:
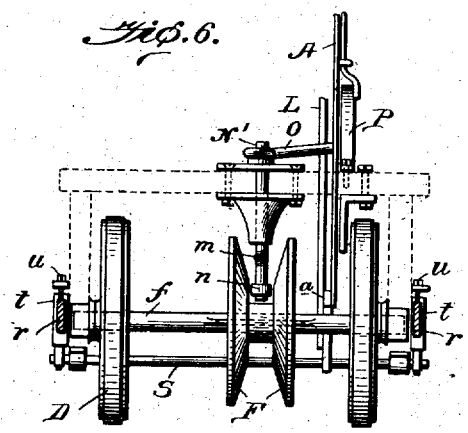
Figure 7:
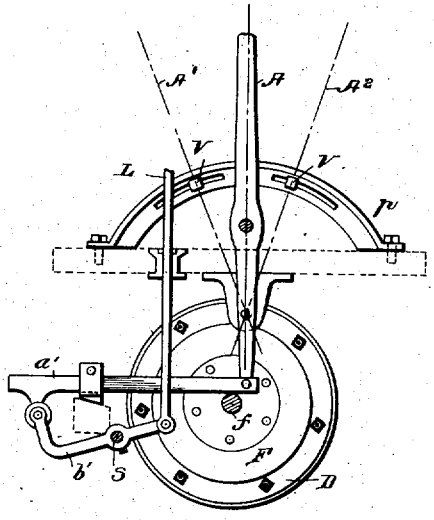
Figure 8:
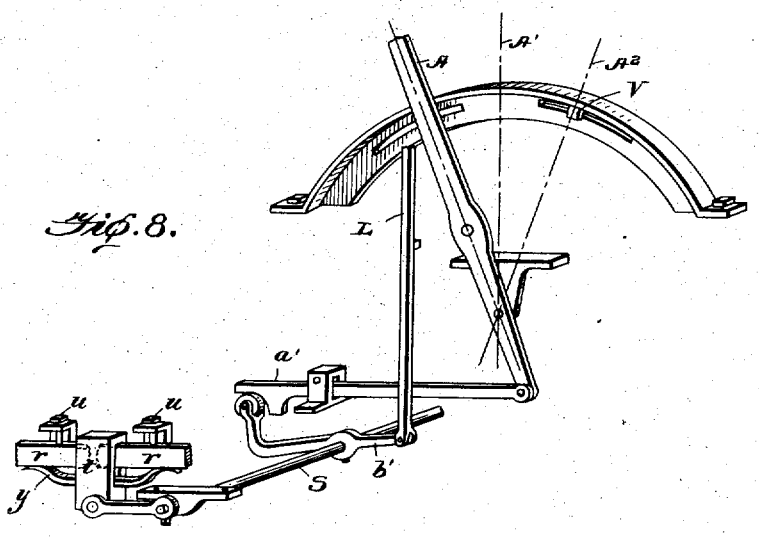

In the accompanying drawings, Figure 1 is a side view of the machine. Fig. 2 represents the rear end of the same. Fig. 3 is a view of the machine below the table hereinafter mentioned looking down. Fig. 4 is a longitudinal section of the same on line 1 and 2 of Fig. 3. Fig. 5 is a view of said table, showing parts of the machine and the place where the operator of the same should stand, designated as Z. Fig. 6 is a transverse section of the main carriage wheels and parts of the mechanism for the forward and rearward movement of the machine. Fig. 7 is a vertical section of parts of the device for raising the rollers hereinafter mentioned. Fig. 8 is an isometrical view of the device for raising and lowering the rollers and connections.

Referring to the drawings, A represents a lever to apply power for the adjustment of the rollers hereinafter mentioned and to impel the machine forward or backward, as may be desired.

A′ indicates the position of the lever when the machine is at rest and the rollers are above the floor, and $A^2$ its position when said machine is moving backward and the rollers are in contact with the floor.

B represents a partial view of an electric motor, which may be of any suitable type giving sufficient power to run the machine.

C represents rollers to be covered with sandpaper for cleaning or surfacing wood floors of every kind, or with felt, or any other suitable material for polishing floors, or with emery or emery-cloth for grinding and polishing mosaic, marble, or composition floors. The position of the lever when the machine is moving forward is as appears in Fig. 1 of the drawings at A.

D represents the main carriage-wheels, which are each fitted or provided with a rubber band or tire to prevent detriment of the floor over which it moves. The front carriage wheels, which are shown at E, are likewise bound with rubber and by the turning of which to either side the steering of the machine is accomplished.

F shows the propelling wheel or driver which works on shaft *f*, and by the sliding of the same sufficiently either way on a pin, not shown, attached to said shaft, the same will engage friction-wheel G, which is driven by the worm gearing on shafts *g* and *b* the operation of lever A causing the said engagement of said wheels within the depression between the two sections of said wheel F, the contact of said wheel G with one of said sections causing the forward movement of the machine and with the other its rearward movement.

*p* represents a curved plate the radius of whose curvature corresponds with the arc described by lever A in its free action opposite thereto, such plate having slots, as shown. By the securing of said lever to said plate at a desired point within one of said slots through the tightening of nut *v* on bolt through said slot and the release of catch attached to said lever sufficient leverage is obtained to force wheel G against one of the sections of wheel F to propel the machine either way, as may be desired.

Arms *r*, carrying rollers C and having boxes at the ends for shafts *d* and *e*, are shown in Fig. 1. The same are also supported and move in boxes *w* at a point approximate the center. The said arms *r* may be adjusted at their inner ends by clasps *t*, as shown, which clasps by the movement of shaft S may be forced up or down, as desired. This shaft having arms or levers at each end will raise or lower the clasps when lever A is moved either way, and thus also raise or lower the inner ends of arms *r*, resulting in the depression or elevation of the outer ends of said arms and of the rollers there supported.

In Fig. 8 the device for raising and lowering such rollers is particularly shown. Lever A is shown pivotally connected to rod or bar *a′*, which rests on the small pulley at the upper end of the curved bar *b′*. The forcing down of the end of said bar *b′* causes the same to act on shaft S, which passes through said bar, as shown, and is secured by a set screw. The turning of shaft S turns the cranks at each end of shaft S, said cranks being fastened to shaft S by set screws, as shown. The said cranks are secured to clasps *t*, the inner ends of the arms *r* penetrating said clasps, as described.

By the operation of wheel *z* the machine may be steered. Said wheel is attached to a shaft having at its end worm-gear *q*, which connects it to shaft 7. At its other end said shaft 7 is connected by an arm to cross tie-bar 8, and said tie-bar is connected by arms to pinions secured to the front carriage-wheels E.

The turning of wheel $z$ either way causes the movement of shaft 7, thereby moving tie-bar 8 and subsequently directing the machine to the right or left, as may be desired.

L represents a lock-bar which is pivoted to the curved bar $b'$ and which is securable in jaws or notches in the table above its place of connection. The same is intended to be operated by pushing it into the jaws when the rollers are up, and they are thereby held in that position. Thereupon lever A may be worked either way for applying the mechanism for propelling the machine forward or backward, as may be desired, and bar $a'$ will operate above the pulley in the curved bar without actuating shaft S. The said bar or shaft $a'$ works through a guide block (shown in Figs. 7 and 8) and which is secured to a cross tie-bar by screws. Lock bar L is preferably forced into the jaws or notch intended to receive it by pushing with the foot. Wheels D are fixed firmly on shaft with which it revolves. Thrusting wheel $n$ is in contact with the propelling wheel F when it is moved on shaft $f$ in the direction desired. Through the operation of lever A the said wheel $n$ is turnable on the spindle N′, having the curvature shown at $m$ in Fig. 4, and by the turning of which wheel F is moved, as mentioned, and the upper end of which is secured to rod $o$, running to and connected with lever A, by which it is operated.

$x$ designates tie-rods to hold the frame of the machine together, and $l$ an iron brace to support the upper frame.

$a$, $b$, $c$, $d$, and $e$ represent shafts which run transversely to the machine, $d$ and $e$ running through rollers C and are turnable by pulleys 4 and 5 respectively, which are propelled by the revolution of shafts $b$ and $c$ and pulleys 2 and 3 as shown. $a$ is the shaft passing through the motor B and has pulley 1, which drives pulley 6 on shaft $b$ and which in turn drives cog-wheel $h$, the latter driving cog-wheel $i$, which turns shaft $c$. Shaft $b$ by means of worm gearing drives shaft $g$, having paper friction wheel G, operating as hereinbefore set forth. At the ends of shaft $f$ the main carriage wheels D turn therewith for the propulsion of the machine in the direction desired.

In each roller C, $t'$ represents a slot, which has a clamp to secure the covering of the roller by screwing down the same, and $x'$ is a rubber bumper to protect the walls of the room in which the machine may run from injury in contact therewith.

It may be necessary to add that pulleys 1, 2, 3, 4, 5 and 6 are driven by belts, as appears in the drawings.

The machine is so constructed as to be able to run close to the walls of the room in which the work required is intended to be done, and the direction of its operation can be easily changed by the use of the steering device hereinbefore mentioned. The rollers C run in opposite directions, and consequently will not cause the movement of the machine; but the same must be effected by the devices hereinbefore mentioned as employed therein. Upon the motion of the machine being reversed the working of bar $a'$ by means of lever A raises the rollers C from the floor, so that they cannot mar the same on which they are intended to operate when the motor is still in operation and the said rollers and the machine are not moving.

$u$ represents a bolt through the bracket on side of frame to adjust roller C. By screwing the same up or down rollers on arm $r$ can be adjusted to run level with the floor, as well as accomplish the adjustment of the weight of the roller on such floor.

Springs are shown at $y$ to allow the rollers to rise from the floor in case of meeting obstructions thereon; also, to cause arms $r$ to bear tightly against bolts $u$.

Having thus described our invention, what we claim and desire to secure by Letters Patent is—

1. In a floor surfacer, cleaner and polisher the combination with rollers covered with material for acting upon floors, centrally-pivoted arms adapted to hold said rollers and to raise and lower them from the floor, springs and screws for limiting the play of the inner ends of said arms, rubber-bound carriage wheels, a lever having at its lower end a pivoted arm working through a guide-block and operating upon a curved bar and connections whereby a clasp covering the inner ends of the arms attached to said rollers may be depressed or allowed to rise so as to raise or lower said rollers, a rod jointed to said curved bar and securable in jaws for holding up said rollers, a propelling-wheel slidable upon the shaft with which it turns and having two sections adapted to be alternately engaged with a friction wheel for the forward or rearward movement of the machine, a thrusting wheel turnable on a vertical and curved shaft for the lateral movement of said propelling wheel on the shaft on which it is mounted, a curved plate having slots with bolts securable therein whereby said lever may be held firmly by means of a catch attached thereto, and means for steering said machine substantially as shown and described.

2. In a floor surfacer, cleaner and polisher the combination with rollers covered with material for acting upon floors, centrally pivoted arms adapted to hold said rollers and to raise and lower them from the floor, springs and screws for limiting the play of the inner ends of said arms, rubber-bound carriage-wheels, a lever having at its lower end a pivoted arm working through a guide block and operating upon a curved bar and connections whereby a clasp covering the inner ends of the arms attached to said rollers may be depressed or allowed to rise so as to raise or lower said rollers, a rod jointed to said curved bar and securable in jaws for holding up said rollers, a propelling wheel slidable upon the shaft with which it turns and having two sections adapted to be alternately engaged with a friction-wheel for the forward or rearward movement of the machine, a thrusting-wheel turnable on a vertical and curved shaft for the lateral movement of said propelling wheel on the shaft on which it is mounted, a curved plate having slots with bolts securable therein whereby said lever may be held firmly by means of a catch attached thereto, and a wheel turning a horizontal shaft having worm-gearing operating a vertical shaft, the same being connected by an arm to a cross tie-bar, and said bar having arms in connection with pinions secured to the front carriage-wheels of the machine substantially as shown and described.

3. In a floor surfacer, cleaner and polisher the combination with a table or platform supported on wheels and movable thereon, rollers covered with material for acting upon floors, centrally pivoted arms supporting said rollers on shafts at their outer ends turnable therewith; means for limiting the play of the inner ends of said arms, a lever having at its lower end a pivoted arm working through a guide block and operating upon a curved bar and connections whereby a clasp covering the inner ends of said arms may be depressed or allowed to rise so as to raise or lower said rollers, a rod jointed to a curved bar and securable in jaws for holding up said rollers, a propelling wheel slidable on a shaft with which it turns and having two sections adapted to be alternately engaged with a friction wheel for the forward and rearward movement of the machine, a thrusting-wheel turnable on a vertical and curved shaft for the lateral movement of said propelling-wheel on the shaft on which it is mounted, means for holding firmly in a desired position a lever for applying power and mechanism to move said machine and a wheel turning a horizontal shaft having worm-gearing operating a vertical shaft, the same being connected by an arm to a cross tie-bar and said bar having arms in connection with pinions secured to the front supporting wheels of the machine substantially as shown and described.

4. In a floor surfacer, cleaner and polisher, the combination with transverse rollers covered with material for acting upon floors connected to a frame mounted on rubber-bound carrying-wheels, centrally pivoted arms supporting said rollers at their outer ends turnable thereon, a clasp inclosing the inner ends of said arms in connection with springs and bolts for controlling the movement thereof, a lever having an attachment for securing the same to an adjustable bolt securable in a slotted curved plate attached to said frame, a propelling wheel slidable on the shaft with which it turns and having two sections adapted to be alternately engaged with a friction-wheel for the forward or rearward movement of the machine, a thrusting-wheel turning on a vertical and curved shaft for the lengthwise movement of said wheel on the shaft on which it is mounted, means for turning said shaft, and a wheel turning a horizontal shaft having worm-gearing operating a vertical shaft, the same being connected by an arm to a cross tie-bar and said bar having arms in connection with pinions secured to the front supporting wheels of the machine and means for the movement of said mechanism substantially as shown and specified and for the purpose described.

5. In a floor surfacer, cleaner and polisher the combination with a frame and carrying-wheels, rollers covered with material for acting upon floors, means for securing said material to said rollers, centrally-pivoted arms adapted to hold said rollers and to raise and lower them from the floor, springs and screws for limiting the play of the inner ends of said arms, a lever having at its lower end a pivoted arm working through a guide-block and operating upon a curved bar and connections whereby a clasp covering the inner ends of said arms attached to said rollers may be depressed or allowed to rise so as to raise or lower said rollers, a rod jointed to said curved bar for holding up said rollers, a propelling-wheel slidable upon the shaft with which it turns and means for changing the direction of its revolution, a curved plate having slots with bolts securable therein whereby said lever may be held firmly by means of a catch attached thereto, and a wheel turning a horizontal shaft having worm-gearing operating a vertical shaft, the same being connected by an arm to a cross tie bar and said bar having arms in connection with pinions secured to the front carrying wheels of the machine for steering the same, substantially as shown and described.

6. In a floor surfacer, cleaner and polisher, the combination of the following instrumentalities, viz: a frame mounted on carrying-wheels, centrally-pivoted arms attached thereto, the outer ends thereof supporting rollers covered with material for acting upon floors, means for limiting the play of the inner ends of said arms, a lever having at its lower end a pivoted arm working through a guide block and operating upon a curved bar and connections whereby a clasp covering the inner ends of the said arms attached to said rollers may be depressed or allowed to rise so as to raise or lower said rollers, means for holding up said rollers at the will of the operator, a propelling wheel slidable upon the shaft with which it turns and having two sections each adapted to be so engaged with a friction-wheel as to compel the forward or rearward movement of the machine, means for the lengthwise movement of said propelling-wheel on the shaft on which it is mounted, a curved blade having slots with bolts securable therein whereby said lever may be held firmly by means of a catch attached thereto, and means for steering said machine, substantially as shown and described.

7. In a floor surfacer, cleaner and polisher the combination of the following instrumentalities, viz: a frame mounted on carrying wheels, centrally pivoted arms attached thereto, the outer ends thereof supporting rollers turning thereon, said rollers being covered with material for acting upon floors, springs and screws for limiting the play of the inner ends of said arms, a lever having at its lower end a pivoted arm working through a guide-block and operating upon a curved bar and connections whereby a clasp covering the inner ends of said arms attached to said rollers may be depressed or allowed to rise so as to raise or lower said rollers, a rod jointed to said curved bar and securable in jaws for holding up said rollers, a propelling wheel slidable upon the shaft with which it turns, and means for changing the direction of its revolution, a curved plate having slots with bolts securable therein, whereby said lever may be held firmly by means of a catch attached thereto, and a wheel turning a horizontal shaft having worm-gearing operating a vertical shaft, the same being connected by an arm to a cross tie-bar and said bar having arms in connection with pinions secured to the front carrying-wheels of the machine for steering the same, substantially as shown and described.

8. A floor surfacing machine embodying a motor, traction wheels supporting the machine and driven by the motor for advancing the machine over the floor and a plurality of motor driven abrading rollers simultaneously operating on the floor surface and rotated in opposite directions whereby the tractive force of one is offset by that of the other to neutralize the tractive influence of the abrading rollers leaving the machine free to move under the influence of the traction wheels.

9. A floor surfacing machine embodying a motor, traction wheels supporting the machine and driven by the motor for advancing the machine on the floor, reversing gearing for reversing the direction of rotation of the traction wheels and direction of movement of the machine and a plurality of motor driven abrading rollers rotated in opposite directions to each other whereby the tractive force of one is offset by that of the other to neutralize the tractive influence of the abrading rollers when the machine is moving in either direction and leaving the machine free to move under the influence of the traction wheels.

10. In a floor surfacing machine the combination with the machine frame and means for supporting said frame on the floor surface, of driven abrading rollers bodily movable on the frame toward and from the floor surface, lever mechanism operated by the attendant for moving said rollers bodily and interposed yielding members through which the pressure is applied for depressing said rollers.

11. In a floor surfacing machine, the combination of a supporting frame mounted on wheels, a motor on the frame, suitable transmission mechanism for driving said wheels from said motor, an abrading roller carried by the frame movable toward and from the surface to be operated on, connections with the motor for revolving the roller, a device acting on the transmission mechanism to place the latter in operative go-ahead position, or in a reversed position, or in neutral inoperative position, and means whereby on the operation of said device to place the transmission mechanism in inoperative position, said abrading roller is automatically placed in inoperative position with respect to the surface to be operated on.

12. In a floor surfacing machine, the combination of a vehicle mounted on wheels, oppositely rotatable abrading rollers on the vehicle movable towards and from the surface to be operated on, a motor on the vehicle to rotate the rollers, and a unitary device for controlling the forward and backward movements of the vehicle and for raising and lowering said abrading rollers.

13. In a floor surfacing machine, the combination of a vehicle mounted on wheels, a non-compressible roller having its axis arranged horizontally and having its surface covered with sand paper, a rockable support, fulcrumed on the vehicle for said roller, means for rotating the roller and a device controlling the movements of the vehicle and operative on said rockable support to raise the roller automatically on the stoppage of the vehicle.

14. In a floor surfacing machine, the combination of a self-propelled wheeled vehicle, counterbalanced rotary abrading rollers yieldingly carried on said vehicle and mounted on horizontal axes and independently movable toward and from the surface to be acted on, means for revolving said rollers and for driving the machine, a device for controlling the forward and backward movements of said vehicle, and means controlled by said controlling device for raising said rollers into inoperative position automatically on the stoppage of the vehicle.

15. In a floor surfacing machine the combination of the following instrumentalities, to wit: a frame, supporting wheels therefor, an abrading roller mounted on a longitudinal axis carried by the frame to move up and down, motor mechanism for propelling the machine and for rotating the roller and a lever member controlling the travel of the machine over the floor and also controlling the raising and lowering of the roller.

In witness whereof we have hereunto set our hands in the presence of two subscribing witnesses.

AARON T. SPENCE.
SAML. B. ZIMMER.
JOHN H. PRUGH.

Witnesses to Spence and Zimmer:
A. M. KERSTAN,
CLARENCE M. REED.

Witnesses to Prugh:
F. F. OHMERT,
JOHN R. HARRISON.